United States Patent [19]

Barry et al.

[11] 4,151,250
[45] Apr. 24, 1979

[54] METHOD FOR BLOW MOLDING PLASTIC ARTICLES

[75] Inventors: James W. Barry, Guilford, Conn.; Andrew C. Dickson, Toledo, Ohio

[73] Assignee: Owens-Illinois, Inc., Toledo, Ohio

[21] Appl. No.: 826,003

[22] Filed: Aug. 19, 1977

Related U.S. Application Data

[63] Continuation-in-part of Ser. No. 659,621, Feb. 20, 1976, abandoned.

[51] Int. Cl.² .............................................. B29C 17/07
[52] U.S. Cl. ................................. 264/532; 264/529; 264/530; 425/526
[58] Field of Search .......................... 264/94, 96–99, 264/89; 425/522, 526

[56] References Cited

U.S. PATENT DOCUMENTS

| | | | |
|---|---|---|---|
| 2,331,702 | 10/1943 | Kopitke | 264/97 |
| 2,991,500 | 7/1961 | Hagen | 264/98 X |
| 3,184,524 | 5/1965 | Whiteford | 264/94 |
| 3,421,179 | 1/1969 | Maiwurm | 264/97 X |
| 3,733,309 | 5/1973 | Wyeth et al. | 264/98 X |
| 3,737,497 | 6/1973 | Hafner et al. | 264/94 |
| 3,803,275 | 4/1974 | Corsover | 264/98 X |
| 3,822,332 | 7/1974 | Hrach et al. | 264/97 |
| 3,966,378 | 6/1976 | Valyi | 265/94 X |
| 4,042,657 | 8/1977 | Ostapchenko et al. | 264/97 X |

FOREIGN PATENT DOCUMENTS

1339479  8/1963  France ........................ 264/98

Primary Examiner—Jan H. Silbaugh
Attorney, Agent, or Firm—R. D. Heberling; M. E. Click; D. H. Wilson

[57] ABSTRACT

A method for forming a molecularly oriented thermoplastic container, wherein a thermoplastic blowable shape such as a parison or a blown pre-form is blown to the configuration of the container within a blow mold cavity. The temperature of the blowable shape is within a range conducive to molecular orientation during the blowing step, which is rapidly performed by hot blow air at a temperature between about 100° to 400° F. Typically, a blowable shape formed of polyethylene terephthalate is blown while the shape is at a temperature within the range of 165° to 200° F. by the introduction into the shape of hot blow air at a temperature within the range of about 165° to 200° F. If desired, the blowable plastic shape may be axially stretched mechanically in addition to being blown in order to improve the biaxial orientation of the thermoplastic material in the final article.

5 Claims, 4 Drawing Figures

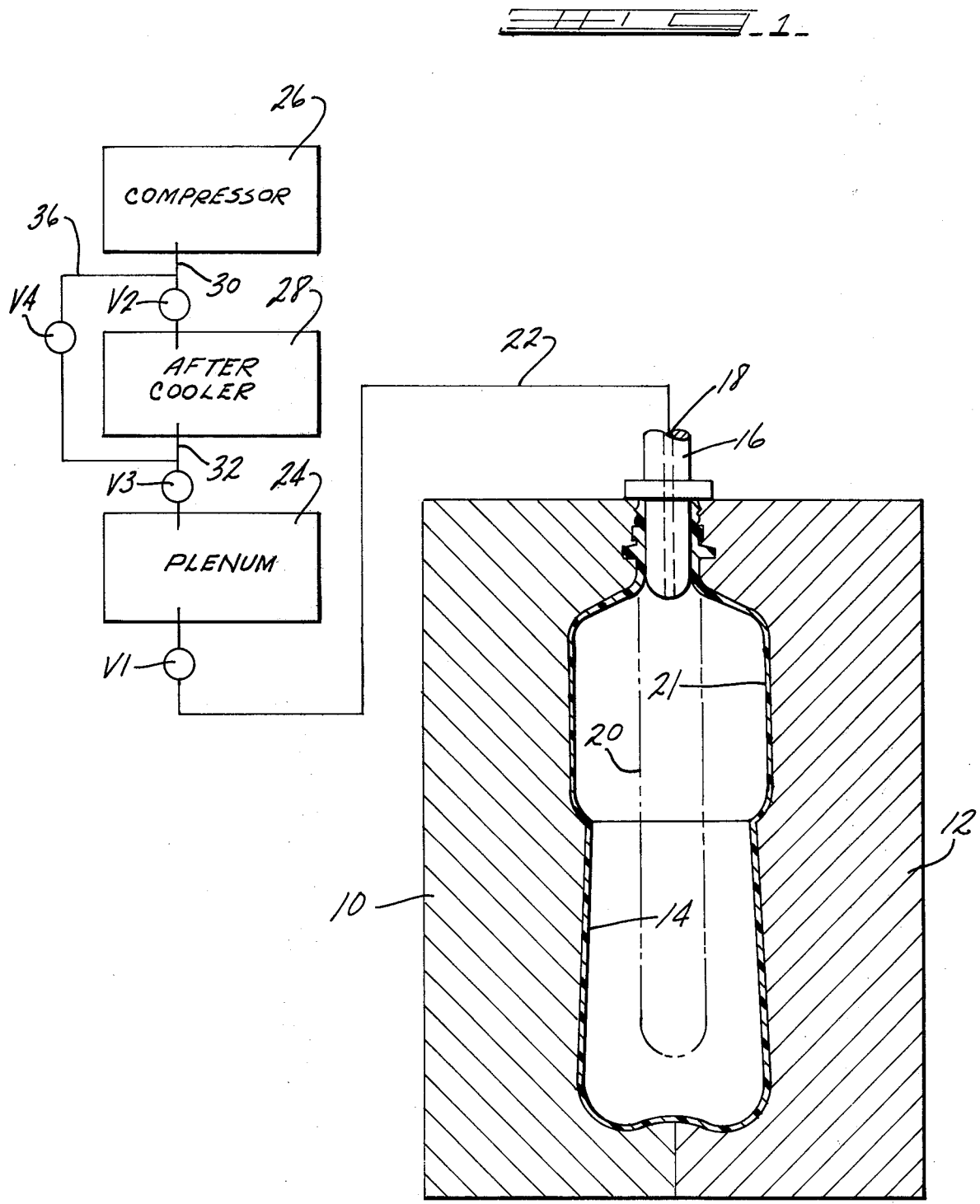

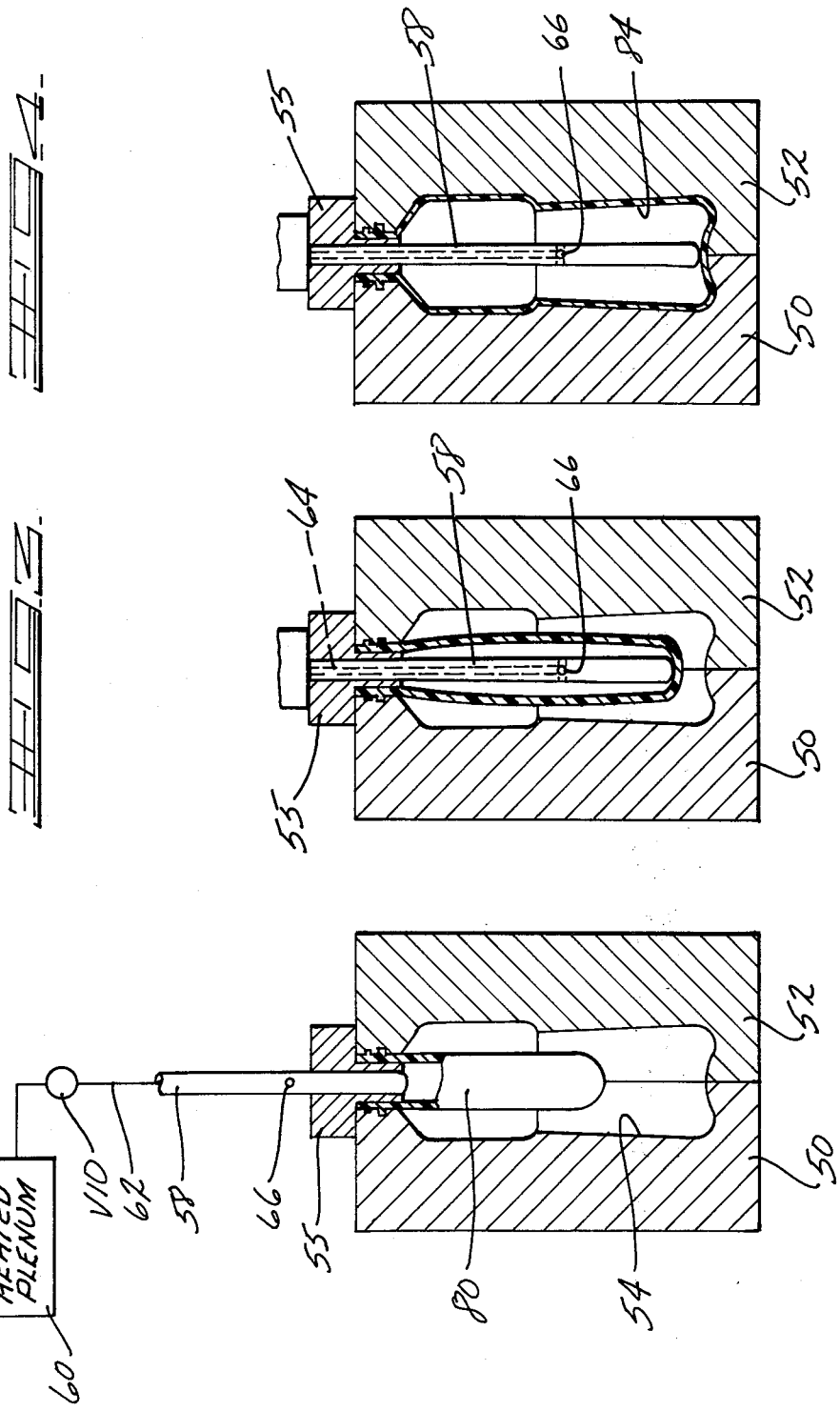

METHOD FOR BLOW MOLDING PLASTIC ARTICLES

CROSS REFERENCE TO RELATED APPLICATIONS

This patent application is a continuation-in-part application of U.S. Ser. No. 659,621 filed on Feb. 20, 1976, now abandoned.

BACKGROUND OF THE INVENTION

This application relates generally to a method for blow molding plastic containers by using unconventionally hot blow air.

In recent years a body of technology has been developed relating to the molecular orientation of plastic materials in bottles, containers, and other blown articles. For example, the following patents, all incorporated by reference, disclose various techniques and apparatus which are adapted to form a molecularly oriented bottle.

First U.S. Pat. No. 3,599,280 to Rosenkranz discloses a method and apparatus for heating a previously formed parison in preparation for a blow molding operation. U.S. Pat. No. 3,767,747 to Uhlig discloses a method and apparatus for an "extrude, blow, and blow" technique, wherein an extruded tubular parison is enclosed within a first blow mold to form a blown pre-form and then the blown pre-form is enclosed within a final blow mold to form the molecularly oriented final bottle. U.S. Pat. No. 3,781,395 also to Uhlig discloses a method and apparatus similar in many respects to that disclosed in U.S. Pat. No. 3,767,747, but further including the concept of sequentially blowing, stretching, and finally blowing the plastic material.

More recently, U.S. Pat. No. 3,873,660 to Reilly has disclosed a method and apparatus for heat treating blown pre-forms to a temperature within the range for substantial molecular orientation during the final blowing operation.

Specific methods and apparatus have also been adapted to form bottles of particular materials. For example, U.S. Pat. No. 3,733,309 to Wyeth discloses a specific molding method and apparatus to form a bottle comprised of polyethylene terephthalate (PET).

All these patents, however, as well as the generally accepted industry-wide methods, utilize blow air that is substantially at room temperature at the time it is injected into the blowable shape.

As will be appreciated by those skilled in the art, molecular orientation during blow molding will not be effectively accomplished unless the plastic material is blown at a temperature conducive to molecular orientation. Certain specific ranges for optimum temperature ranges are set forth in U.S. Pat. No. 3,781,395, incorporated by reference. Additionally, British Pat. No. 921,308, incorporated by reference, sets forth in Tables I and II temperature ranges that are widely accepted, especially in parison reheat operations prior to blowing. Examples of the temperature ranges listed in the British patent include: 70°-145° C. for polyvinyl chloride, depending upon the percentage of plasticizer present; 100°-160° C. for polypropylene, depending upon the density of the material; and 50°-130° C. for polyethylene, depending upon density. Additionally, it has been found the ideal temperature for polyethylene terephthalate varies directly with the molecular weight, but generally falls within the range of 165°-200° F.

In order to promote molecular orientation it is desirable to blow the blowable shape when the material is at its lowest practical temperature. Due to the adiabatic expansion of the blow air, the material may be cooled during blowing to a temperature at which undesirable results occur.

A first undesirable result is caused by the cold blow air striking a localized region of the blowable shape. This produces a cold spot in the blowable shape, causing differential expansion and variances in wall thickness on the blown article.

In regard to a further undesirable result, Applicants have observed that certain thermoplastic materials, most notably PET, develop a white haze in the bottle wall thickness during blowing. After study of this phenomenon, it now appears that the white haze is actually a region of stress whitening, resulting from a variety of factors: first, the expanding, cooling blow air chills the inside surface of the parison; the material then tends to stress whiten as a result of being expanded and stretched too rapidly for the temperature of the chilled inner surface. This stress whitening may take the form of either stress cracking or stress crazing. When a stress crack occurs, a small void of material is developed, whereas with stress crazing there is no void in the stress-developed flaw. Microscopic examination indicates that the stress whitening observed by Applicants is predominantly of the stress crazing type flaw.

It has been found that incidence of stress whitening may be reduced by reducing the rate of expansion of the blowable shape to form the final article. This may be accomplished by either (1) reducing the blow air pressure or (2) throttling blow air into the blowable shape. Both these procedures, however, consume additional time in the overall blow molding cycle.

SUMMARY OF THE INVENTION

The essence of this invention is forming a blown article by using blow air at a temperature between about 100° and 400° F. Although the disclosed method may be utilized in any bottle forming operation, it is most advantageously used to inflate blowable plastic shapes or pre-forms which tend to develop a white stress haze when expanded at a temperature conducive to molecular orientation. Examples of materials which have exhibited a tendency to develop the stress whitening include polyethylene terephthalate, nitriles, polyethylene, polypropylene and polyvinyl-chloride.

The present invention overcomes the prior art problems by using hot blow air, which cools to near room temperature as a result of adiabatic expansion during the blow molding cycle and therefore does not drastically chill the inner surface of the blowable thermoplastic shape. The present hot blow method is contrary to the general view that blow molding is a cooling process most rapidly accomplished by using relatively cool blow air, yet, this process overcomes the problem of stress whitening while at the same time increasing operation speed.

The disclosed method and apparatus includes, first, closing the sections of a blow mold on a blowable plastic shape. This shape may be an extruded or an injection molded parison or may alternatively be a blown pre-form. In the most preferred embodiment, the blowable plastic shape will be at a temperature conducive to substantial molecular orientation, for example within the range of about 165° to 200° F. for polyethylene terephthalate. Next, the blowable shape is expanded to the configuration of the blown article by injecting blow air under pressure into the blowable shape, at a temperature within the range of about 100° to 400° F. prior to any reduction in temperature as a result of adiabatic expansion.

A more preferred range for the hot blow air is from about 150° to 300° F., and when using PET material, the most preferred range is from about 165° to 250° F., although these ranges may vary depending upon the temperature of the plastic material.

In another preferred embodiment, the blowable shape is axially stretched either prior to or simultaneously with the blowing operation to establish biaxial orientation. For example, it has been determined that the best strength characteristics are developed in PET material when the blowable shape is stretched from about 1 to 5 times its original length prior to the blowing step.

The present invention, therefore, provides the following advantages: (1) the elimination or reduction of a haze of stress whitening which results from drastically chilling the inner surface of the blowable shape and then rapidly expanding the plastic material during the blowing operation; (2) better wall thickness distribution, because the blowable shape is not unduly chilled in a localized region near the injection port in the blow pin; (3) a decrease in cycle time over prior methods of eliminating the haze of stress whitening; and (4) the elimination of flow control orifices and valving mechanisms to throttle blow air.

Other advantages and meritorious features of the present invention will be more fully appreciated by those skilled in the art from the following detailed description of the invention and the appended claims.

BRIEF DESCRIPTION OF THE DRAWINGS

FIG. 1 is a schematic view of a blow molding arrangement under the present invention, wherein a blowable tubular parison is expanded in a blow mold cavity.

FIG. 2-4 are schematic illustrations of a second proposed embodiment, including a mechanism for stretching the blowable plastic shape prior to or simultaneously with the blowing operation.

DETAILED DESCRIPTION OF THE PREFERRED EMBODIMENTS

Referring now to the drawings, FIG. 1 illustrates a first embodiment for accomplishing one aspect of the present invention; i.e., supplying hot blow air to expand an orientable, blowable plastic shape in order to reduce or eliminate a white haze of stress crazing and/or stress cracking in the final article.

Reference numerals 10 and 12 denote blow mold halves which collectively define, when closed, a blow mold cavity 14 to form a blown bottle, the cavity including a rounded bottom portion, a body portion for the blown article, and a neck or finish region. A blow pipe 16 is insertable within the neck region of the blow mold cavity 14 and includes a bore 18 for supplying blow air under pressure. Suitable hydraulic power means (not shown) may be utilized to open and close the molds and to move the blow pipe axially of the blow molds, as is conventional in the art.

In operation, a thermoplastic blowable shape 20, such as an injection molded closed-end parison, is positioned between the opened mold halves 10 and 20, which are then closed upon the blowable shape. The blow pipe 16 is then inserted into the open end of the blowable shape 20 to compression mold the neck or finish region of the final article, also as is conventional in the art. The blowable shape may consist of either an injection molded parison, an extruded parison which will be pinched shut at its bottom by closure of the blow molds, or a blown pre-form which is formed in a first blow mold cavity in accordance with the teachings of U.S. Pat. Nos. 3,767,747 or 3,781,395.

After insertion of blow pipe 16, hot blow air is supplied through bore 18 to expand the blowable shape 20 to the configuration of mold cavity 14 and thereby form bottle 21. This is accomplished in the present invention by a flow line 22 which includes a suitable valve V1 and establishes communication between the bore 18 and an air storage plenum 24.

In somewhat conventional operations, a compressor 26 would supply air under pressure to plenum 24 by way of an after cooler 28 and interconnecting flow lines 30 and 32, having respective valves V2 and V3. In conventional operations, the after cooler reduces the temperature of the compressed air to approximately room temperature.

As discussed previously in earlier portions of this disclosure, blow air under pressure undergoes a rapid cooling when injected into an expandable parison due to adiabatic expansion. If the blow air is originally at about room temperature, as is conventional, then the adiabatic expansion reduces the temperature of the blow air and adversely chills the inner surface of the expandible blowable shape. This adverse cooling results in (1) a non-uniform wall thickness in the blown article because that portion of the parison nearest the entry port of the blow pin is cooled to a greater extent than other portions and (2) a haze of stress whitening on the inner surface of the plastic material because the parison is being expanded too rapidly for the inner surface chilled condition.

Thus, the present invention provides a flow line 36 and a suitable valve V4 between flow lines 30 and 32 to bypass the after cooler and supply hot air under pressure to plenum 24. This hot air is then supplied from the plenum to bore 18 in blow pin 16 as previously discussed.

One preferred temperature range for the hot blow air is from about 100° F. to about 400° F. This range, however, may vary depending upon the particular material being blown. For example, a more preferred range might be from approximately 150° F. to about 300° F.; the increased lower limit assuring that the blowable plastic shape is not adversely chilled and the reduced upper limit assuring that the blowable plastic shape is not locally heated to above the orientable temperature. Further, since the orientable temperature range for polyethylene terephthalate is from about 165° to 200° F., the most preferred temperature range for the hot blow air for this material is from about 165° F. to about 300° F.

In accordance with the most preferred embodiment of this invention, the blowable plastic shape 20 will be at a temperature conducive to molecular orientation during the blowing operation to establish an oriented final article. As will be appreciated by those skilled in the art, the term "conducive to molecular orientation" refers to that temperature range above the glass transition point for essentially amorphous polymers and below the temperature where no orientation is maintained after the article has cooled. For example, the glass transition point for polyethylene terephthalate is approximately 163° F. For this particular material a suitable temperature range conducive to molecular orientation is between about 165° F. and 200° F. Temperature ranges for other plastic materials have been previously discussed in earlier portions of this application as well as being set forth in several of the patents which have been incorporated by reference.

The pressure of the blow air may be chosen as desired, such as at a somewhat conventional blowing pressure of from about 100 psi up to about 150 psi for many common materials. Alternatively, the blow air pressure may be varied within desirable limits, such as from about 150 psi to as high as from about 400 psi up to about 500 psi when blowing polyethylene terephthalate.

As a further alternative, the initial blowing pressure preferably is about 150 psi with the pressure being increased, after initial blowing, to a pressure of about 400 to about 500 psi. In this way, the initial blowing of the parison is carried out less abruptly and with less danger of stress crazing or stress whitening, particularly with low intrinsic viscosity polyethylene terephthalate material (on the order of about 5 to about 7 i.v. material). The high final blowing pressure of 400 to 500 psi is desirable to yield fine detail in the final blown article, particularly where the material is blown to an extent such that stress hardening of the material is obtained in the final blown article. The blowing of the shape at the two successive pressures may be effected readily by the incorporation of two flow ports into the valve VI, so that the initial pressure in the line 22 is about 100 to about 150 psi, followed by shifting of the valve VI to elevate the pressure in the line 22 to the higher value of about 400 to about 500 psi.

An improved method, according to the present invention, comprises the steps of closing the sections of the mold around the blowable plastic shape; injecting blow fluid under pressure into the blowable shape while said shape is at a temperature conducive to molecular orientation within the range of about 165° to about 200° F., the blow fluid being (a) at a pressure of at least about 150 psi and (b) at a temperature between about 150° F. and about 400° F. when injected into the blowable shape prior to any adiabatic expansion, after the blowable shape has been substantially blown to its final shape, increasing the blow fluid pressure to at least about 400 psi, and the injecting step being performed in less than about three seconds; and removing the blown article from the blow mold.

The total blowing time will, of course, be somewhat dependent upon the size of the final container. However, the present invention enables more rapid blowing times than the prior art attempts to eliminate the haze of stress whitening. For example, previous methods included blowing times from 3 to 4 seconds to form 32 ounce bottles. The present invention will enable blow times of less than 3 seconds and will enable reducing the prior blow times by onehalf; i.e., to about 1 to 1 ½ seconds.

As is conventional in the art of blow molding, the blow air will expand the blowable shape 20 outwardly into contact with the surfaces of cavity 14 to form bottle 21, the contact of the plastic material with the mold walls serving to cool the material. After a sufficient swell time within the mold cavity, the blow mold halves 10 and 12 are opened and the final bottle 21 is ejected from the blow pin 16.

Referring now to FIGS. 2–4, a second embodiment is disclosed wherein the blowable plastic shape is stretched axially during the blow molding operation.

Reference numerals 50 and 52 indicate blow mold halves which collectively define a bottle cavity 54 including a rounded bottom and a neck or finish region. In this embodiment, a blow pin support collar 55, includes an annular projection 56 which is inserted within the neck region of the cavity to compression mold the finish portion of the final article. An axially elongated, reciprocal blow pin 58 is supported coaxially of the collar 56 for stretching the blowable shape either prior to or simultaneously with the blowing operation.

Hot blow air in this embodiment is supplied to the blowable shape from a heated plenum 60 by way of an openable valve V10 in a flow line 62 which communicates with an axial bore 64 in the elongated blow pipe 58. As illustrated in FIGS. 3 and 4, the axial bore 64 terminates in radially directed blow ports 66 which supply the hot blow air to the interior of the blowable shape.

The plenum is disclosed in this embodiment as heated in the event that either cool air is received from a pressure source by way of flow line 70 or if the air under pressure requires heating to achieve the desired temperature in accordance with the previous disclosure.

In operation, the blow mold halves 50 and 52 are closed upon a blowable plastic shape 80 which is preferably at a temperature within the range conducive to substantial molecular orientation. Next, the collar 55 is inserted into the neck region of the blow mold cavity to compression mold the finish region of the final article.

Next, as illustrated in FIG. 3, the elongated blow pipe 58 is advanced downwardly to stretch the blowable plastic shape 80 either prior to or concurrent with the blowing operation. For example, it has been found desirable to longitudinally stretch polyethylene terephthalate material prior to the radial expansion; however, this material may also be radially expanded during the stretching operation.

Hot blow air within the range of about 100° to 400° F. is then supplied through bore 64 and radial ports 66 to inflate the stretched, blowable shape to the configuration of the final article 84. Of course, the more preferred temperature ranges for the blow air, the same blowing times and the same temperatures for the particular plastic materials may be used in this embodiment as discussed above in relationship to the embodiment of FIG. 1.

Although certain portions of this disclosure have been directed to particular plastic materials, it will be understood by those in the art that this improved method may be employed advantageously with any plastic material which has a tendency to develop a haze of stress whitening; i.e., either stress cracking or stress crazing, when rapidly blown at a temperature conducive to molecular orientation.

Having therefore completely and fully disclosed our invention, we now claim:

1. In a method of making a clear blown article by blow molding a blowable plastic shape consisting essentially of polyethylene terephthalate, which tends to develop a haze of stress whitening when rapidly blown at a temperature conducive to molecular orientation, the steps of:
    closing the sections of a blow mold around a blowable plastic shape consisting essentially of polyethylene terephthalate;
    injecting blow fluid under pressure into the blowable shape while said shape is at a temperature conducive to molecular orientation within the range of about 165° to about 200° F., the blow fluid being (a) at a pressure of between about 400 and about 500 psi and (b) at a temperature between about 150 degrees F. and about 400 degrees F. when injected into the blowable shape prior to any adiabatic expansion, and the injecting step being performed in less than about three seconds; and removing the blown article from the blow mold.

2. The method of claim 1, further including the step of axially stretching the blowable shape prior to the injecting step, in order to biaxially orient the polyethylene terephthalate material of the blown article.

3. The method as defined in claim 1, further characterized by the blow fluid being at a temperature within the range of from about 165° to about 300° F. when injected into the blowable shape prior to any adiabatic expansion.

4. The method as defined in claim 1, further including the steps of:

storing the heated blowing fluid under pressure within a plenum prior to its injection into the blowable plastic shape; and supplying the fluid under pressure to the plenum from a compressor through a flow line which bypasses an after-cooler that normally cools the blow fluid prior to its injection into a blowable plastic shape.

5. A method of making a clear blown bottle of polyethylene terephthalate which is essentially free of any haze caused by stress whitening and which is biaxially oriented, comprising the steps of:

closing the sections of a blow mold around a blowable plastic shape consisting essentially of polyethylene terephthalate;

axially stretching the blowable shape while the polyethylene terephthalate material is at a temperature conducive to molecular orientation in the range of from about 165° F. to about 200° F.;

injecting blow fluid under pressure into the stretched blowable shape while said material is still at a temperature conducive to molecular orientation in said temperature range, the blow fluid being at a pressure of between about 400 and about 500 psi and at a temperature between about 150° F. and about 400° F. when injected into the blowable shape prior to any adiabatic expansion;

during the streching and blowing steps, molecularly orienting the polyethylene material without developing a haze of stress whitening; and removing the blown article from the blow mold as a biaxially oriented, clear article.

* * * * *